United States Patent
Tester

(10) Patent No.: US 7,539,680 B2
(45) Date of Patent: May 26, 2009

(54) REVISION CONTROL FOR DATABASE OF EVOLVED DESIGN

(75) Inventor: David Tester, Preston (GB)

(73) Assignee: LSI Corporation, Milpitas, CA (US)

( * ) Notice: Subject to any disclaimer, the term of this patent is extended or adjusted under 35 U.S.C. 154(b) by 1472 days.

(21) Appl. No.: 10/143,155

(22) Filed: May 10, 2002

(65) Prior Publication Data
US 2003/0212718 A1 Nov. 13, 2003

(51) Int. Cl.
G06F 17/30 (2006.01)

(52) U.S. Cl. ............... 707/9; 707/101; 707/102; 707/103 X; 707/104.1; 707/203; 707/204; 726/2; 726/4; 726/29

(58) Field of Classification Search ......... 707/10, 707/203, 205, 9, 511, 101, 102, 103 X, 104.1, 707/204; 711/147; 713/193, 200, 201; 705/59; 340/5.61; 709/232, 225; 715/511; 380/4; 726/2, 4, 29
See application file for complete search history.

(56) References Cited

U.S. PATENT DOCUMENTS

| | | | | |
|---|---|---|---|---|
| 5,566,319 A * | 10/1996 | Lenz | ............... | 711/147 |
| 5,708,709 A * | 1/1998 | Rose | ............... | 705/59 |
| 5,968,175 A * | 10/1999 | Morishita et al. | ............... | 713/200 |
| 5,983,277 A * | 11/1999 | Heile et al. | ............... | 709/232 |
| 6,192,361 B1 * | 2/2001 | Huang | ............... | 707/9 |
| 6,405,223 B1 * | 6/2002 | Kelley et al. | ............... | 715/511 |
| 6,477,530 B1 * | 11/2002 | Omata et al. | ............... | 707/9 |
| 6,772,156 B1 * | 8/2004 | Rogers et al. | ............... | 707/9 |
| 7,076,795 B2 * | 7/2006 | Hahn | ............... | 726/2 |
| 7,275,264 B2 * | 9/2007 | Cuenod et al. | ............... | 726/29 |
| 2002/0005774 A1 * | 1/2002 | Rudolph et al. | ............... | 340/5.61 |
| 2002/0019730 A1 * | 2/2002 | Garner et al. | ............... | 703/14 |
| 2003/0135755 A1 * | 7/2003 | Hahn | ............... | 713/201 |
| 2003/0200451 A1 * | 10/2003 | Evans et al. | ............... | 713/193 |

FOREIGN PATENT DOCUMENTS

EP 0768624 A2 * 4/1997

OTHER PUBLICATIONS

Pierangela Samarati et al., "An authorization model for a public key management service", ACM, 2001, pp. 453-482.*
Soumen Chakrabarti et al., "Scalable feature selection, classification and signature generation for organizing large text databases into hierarchical topic taxonomies", The VLDB Journal, 1998, pp. 163-178.*

* cited by examiner

Primary Examiner—Thuy N Pardo
(74) Attorney, Agent, or Firm—Christopher P. Maiorana, PC

(57) ABSTRACT

The invention relates to a method of controlling access to a database of a design. The method may comprise the step of identifying a version of the design by a first identifier, allocating first authorization information to the first identifier, and controlling access to the database. The first authorization information may indicate a permission of one or more users to access information in the database in respect of the first identifier. The access may be controlled in accordance with the first authorization information.

21 Claims, 4 Drawing Sheets

REVISION CONTROL FOR DATABASE OF EVOLVED DESIGN

FIELD OF THE INVENTION

The present invention relates to revision control for a database of an evolved design. The invention may be especially, but not exclusively, suitable for a design database of an integrated circuit, containing evolutions or different versions of the circuit design.

BACKGROUND TO THE INVENTION

Conventionally, an integrated circuit design is defined by a set of design files contained in a database. Typically, the design of the circuit may evolve during the design process, and the database contains not only the most recent design files, but also an archive of the evolution of the design files. So-called "revision control" is used to track changes made to the design files, and to allow previous versions of a design file to be "re-created" even though the design file may have evolved since.

A version of the files defining a certain significant state of the design is normally identified by a so-called "symbolic tag". The symbolic tag is an alpha/numeric name with which the versions of the files defining that state are associated. For example, symbolic tags of an evolved design may be called "Version1", "Version2", etc. In order to "retrieve" or revert to a certain state of the design, the versions of the design files associated with a certain symbolic tag are accessed through a revision control operation by means of the symbolic tag name. As mentioned above, this enables certain versions or states of the design to be retrieved, even though the design may since have evolved.

However, the above technique has several problems. An integrated circuit is typically designed by one or more teams of designers, who may be spread geographically. Each designer has access to read and modify each file in the database, in order to develop the design. Such reading and modification often involves accessing the symbolic tags, and modifying respective files. This allows significant file versions to be accidentally disassociated with a symbolic tag, or for an association to be overwritten accidentally. Furthermore, integrated circuits are becoming increasingly complex, and require an ever increasing number of design files, whose size generally increases. If associations of file versions with a certain symbolic tag are corrupted as mentioned above, then identifying and correcting this problem is very time consuming and labour intensive. The increasing complexity of integrated circuits also means that the costs of mask preparation used in production are also more expensive for each new generation of a manufacturing process. Often an error which may be caused by a symbolic tag corruption may not be identified until after the production mask has been manufactured, and problems are detected on testing the manufactured integrated circuit. As well as the time and labour involved in identifying the error, correction of the circuit then requires a new production mask to be manufactured, increasing the costs yet further.

SUMMARY OF THE INVENTION

The invention relates to a method of controlling access to a database of a design. The method may comprise the step of identifying a version of the design by a first identifier, allocating first authorization information to the first identifier, and controlling access to the database. The first authorization information may indicate a permission of one or more users to access information in the database in respect of the first identifier. The access may be controlled in accordance with the first authorization information.

The objects, features and advantages of the invention include: (i) an ability to restrict access of users to be able to modify identifier information; (ii) an ability to restrict modification permission to only certain users; and/or (iii) reducing the risk of identifier corruption and an associated disruption resulting from identifier corruption.

BRIEF DESCRIPTION OF THE DRAWINGS

An embodiment of the invention is now described by way of example only, with reference to the accompanying drawings, in which.

DETAILED DESCRIPTION OF A PREFERRED EMBODIMENT

Figure 1:
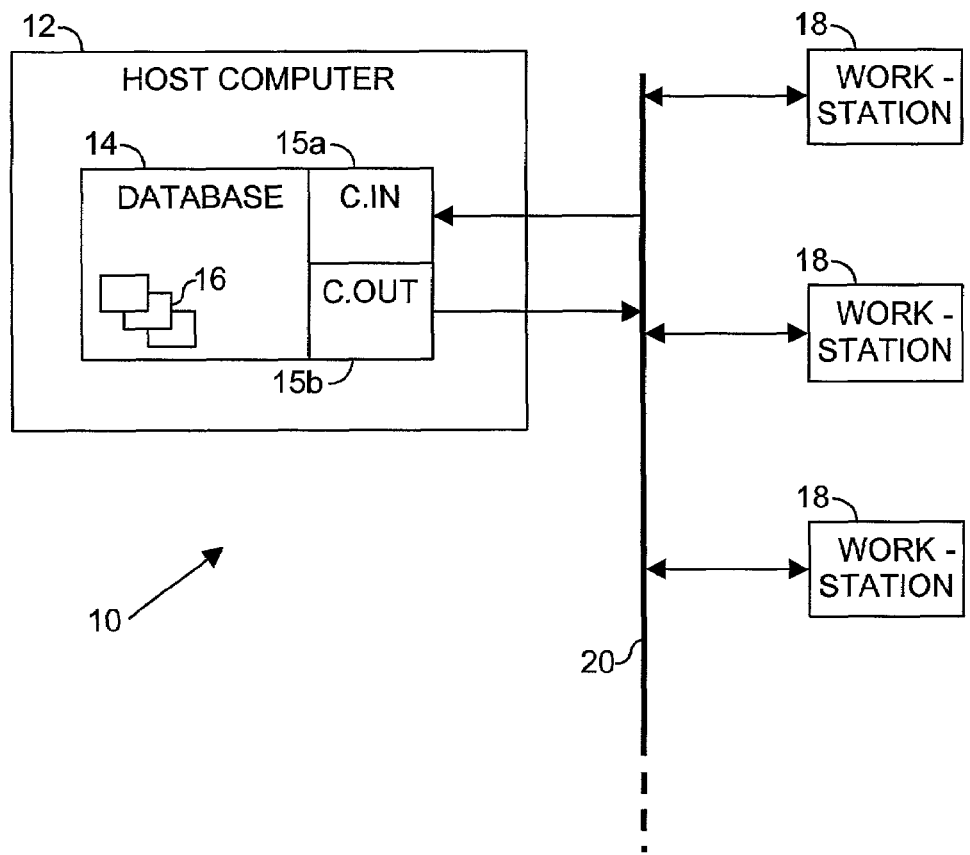
FIG. 1 is a schematic block diagram showing a distributed computer based system for use in designing an integrated circuit.

Referring to FIG. 1, a distributed computer based system 10 is illustrated for use in managing the designing of an integrated circuit. The system 10 may generally comprise a host computer 12 implementing a master database 14 of design files 16. Remote workstations 18 may be coupled to the host computer 12 via a network 20 for enabling a team of designers or users working at the workstations 18 to create and modify the design files 16 defining the design of the integrated circuit. The workstations 18 may be located at the same geographical site and be coupled by a local network (not shown), or one or more of the workstations 18 may be located at a different geographical site, and coupled by a larger area network (not shown). Each workstation 18 may run its own design tool software, or each workstation may provide design parameter inputs to the host computer 12 for effecting design tasks at the host computer 12, or a combination of both.

Figure 2:
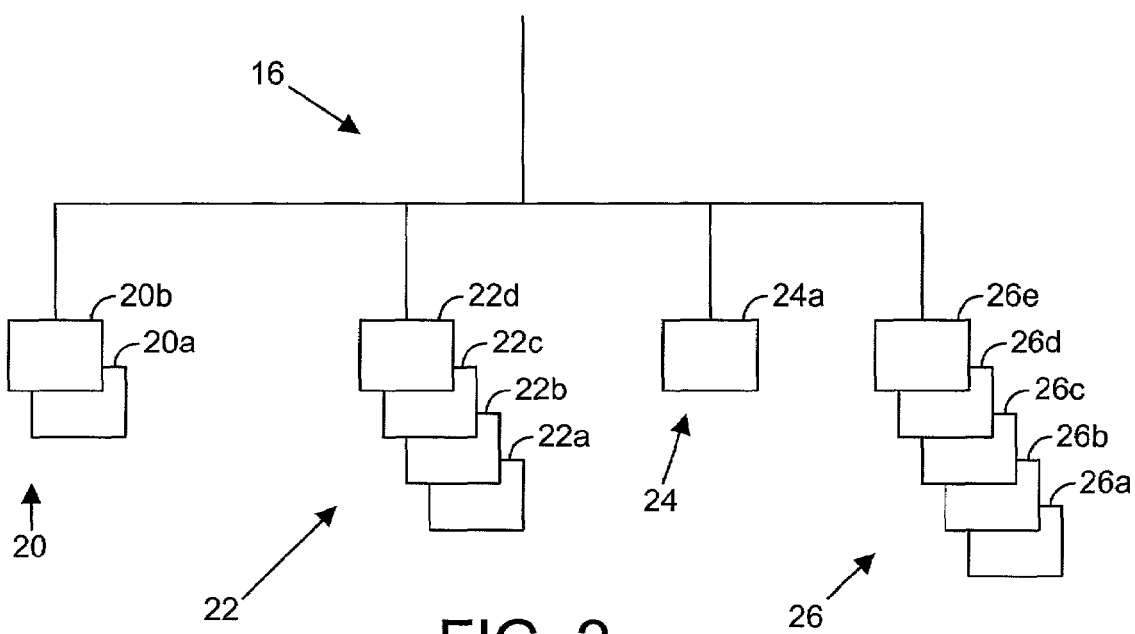
FIG. 2 is a schematic diagram showing an evolution of a design of an integrated circuit.

Referring to FIG. 2, the design files 16 are typically organized as a set of module files 20-26 which together define the design of the integrated circuit. Four module files 20-26 are shown in FIG. 2, although it will be appreciated that a complicated integrated circuit design may include hundreds or thousands or more of such module files. Each module file 20-26 may generally represent a module or a functional cell of the integrated circuit. It is quite common for the design of one or more modules of the integrated circuit to be modified during the design process, as the design is refined or modified to overcome problems, or to improve performance, or to enhance the product in some fashion. The modifications may be referred to herein as the design evolving. Such evolution of the module design may be tracked by the host database 14 by recording different versions of the respective module file 20-26 as the module design evolves.

In the specific example illustrated in FIG. 2, the first module file 20 may include two versions 20a and 20b, the second module file 22 may include four module versions 22a-d, the third module file 24 may include a single version 24a, and the fourth module file 26 may include five versions 26a-e.

Referring again to FIG. 1, the master database 14 may include a user interface 15 for controlling information access in the database 14. The user interface 15 may include a "check-in" engine 15a for enabling a version of a module file 20-26 to be recorded in the database 14. The user interface 15 may also include a check-out engine 15b for enabling specific versions of one or more module files 20-26 to be read out (but not removed) from the database 14.

Figure 3:
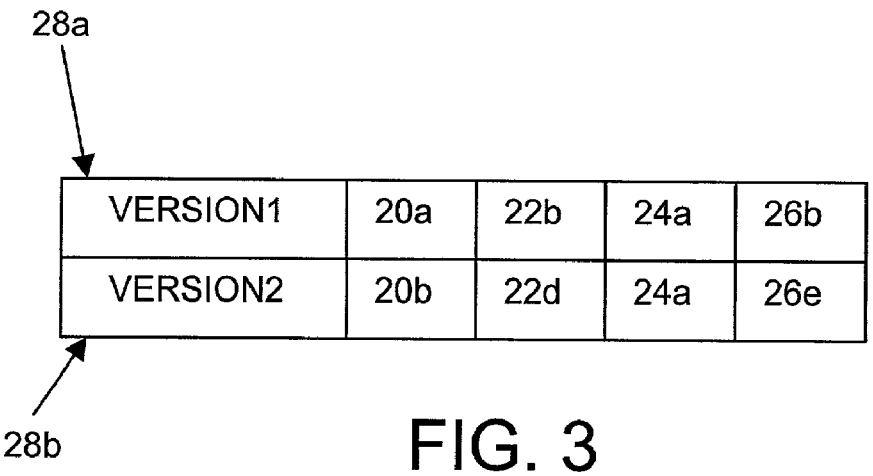
FIG. 3 is a schematic diagram showing an example of tags associated with module file versions.

Referring also to FIG. 3, a specific state of the integrated circuit design may be represented by an identifier, also referred to herein as a tag 28 or a symbolic tag. Such a tag 28 may be a name (e.g., an alphabetic and/or numeric character string) with which certain versions of the module files 20-26 are associated. Purely as an example, for a first tag 28a called "Version1", certain module file versions 20a, 22b, 24a and 26b may be associated with the first tag 28a. For a second, more evolved version of the circuit represented by a second tag 28b called "Version2", certain more evolved module file versions 20b, 22d, 24a and 26e may be associated with the second tag 28b. The association of individual versions of module files 20-26 with a tag 28 may be controlled by one or more of the designers, as explained later. By using the name of the tag 28, a designer may recall, or recreate, a specific version of the integrated circuit design, even if the specific version may not be the most up to date version. The retrieval of the appropriate module file versions for a certain tag 28 may be performed by the check-out engine 15b. The retrieval function may be referred to herein as "execution" of the tag 28 (e.g., to retrieve the appropriate module file versions associated with the tag 28).

Figure 4:
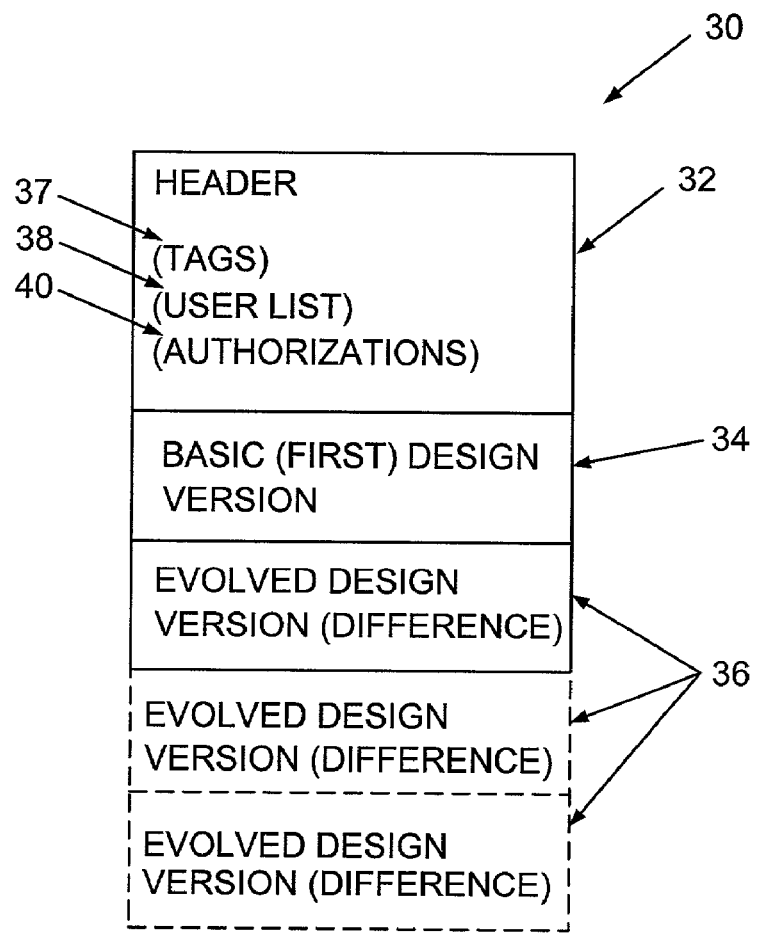
FIG. 4 is a schematic diagram showing an example of a module design file.

FIG. 4 shows an example of an organization of information in a generic module file 30 (which may be any of the module files 20-26). One feature of the generic module file 30 may be that all of the different versions of that file 30 are stored in the same file 30. Another feature of the generic module file 30 may be that, instead of recording the whole content of each different version, only the differences between versions may be recorded. Storing the differences may reduce the amount of data created by multiple versions. Alternatively, each version may be recorded individually without reference to another version.

Referring to FIG. 4, in the present example, the generic module file 30 may generally comprise a header 32, a basic (first) design version 34, and one or more evolved design versions 36. The basic design version 34 generally represents the first recorded version of the module file. Each evolved design version 36 generally represents the differences between that evolved version and a preceding version. The preceding version may be the basic design version 34 or the immediately preceding evolved design version 36. In the latter case, in order to "construct" the latest version, each preceding design may be constructed in turn, starting from the basic design 34, until the desired version is arrived at. The creation of an appropriate evolved design version 36 when the module file version is recorded in the database 14 may be performed by the check-in engine 15a. The reconstruction of an appropriate version of the module file (from the basic version 34 and one or more evolved (difference) versions 36) may be the function of the check-out engine 15b.

In the example, the header 32 may contain information 37 about any tags 28 with which different versions of the module file 30 are associated. The header 32 may also contain a list 38 of designers (identified either individually or collectively in groups) and authorizations 40 associated with those designers. The authorizations may include one or more of an authorization to view the module design, and an authorization to modify and record an updated version of the module design. Each authorization may be in the form of a binary flag indicative of whether or not permission may be granted to the designer for that authorization.

Figure 5:
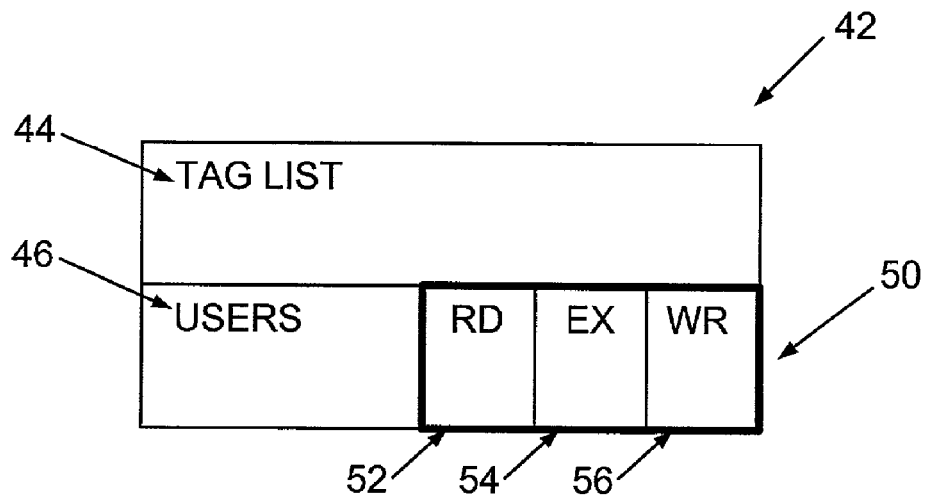
FIG. 5 is a schematic diagram showing an example of a tag file.

Referring to FIG. 5, in an advantageous implementation, a tag file 42 may also be provided for each tag 28. The tag file 42 may include a list 44 of the module file versions associated with the tag 28. In a similar manner to module file 30, the tag file 42 may also include a list 46 of designers (identified either individually or collectively in groups) and tag authorizations 50 associated with those designers. The tag authorizations 50 may include one or more of a tag read authorization 52, a tag execute authorization 54, and a tag write authorization 56. Each tag authorization 52-56 may be in the form of a binary flag indicative of whether or not permission is granted to the designer for that authorization.

The tag read authorization 52 may indicate whether the designer is generally authorized to view (or "read") the list 44 of module file versions associated with the tag 28. The tag execute authorization 54 may indicate whether the designer is generally authorized to "execute" the tag 28 to retrieve (check-out) the set of module file versions associated with the tag 28. The tag write authorization 56 may indicate whether the designer is generally authorized to modify any information associated with the tag file 42, for example, modify the list 44 of module file versions associated with the tag 28, or modify the tag authorizations 50.

By separating the permissions associated with different access types to the tag 28, and controlling which designers have access to modify a tag 28, the integrity of the tag 28 may be more closely protected. Only designers who have write authorization may access the tag 28 to modify the association of module file versions with the tag 28.

As mentioned above, designers may either have individual authorizations or collective authorizations according to the group to which they belong. Furthermore, authorization may be allocated based upon what type of user a particular designer may be and/or based upon an identity of the particular designer. Typically, a project design type leader (or a group leader) may have all tag authorizations 52, 54 and 56. An in-house designer may have only read authorization 52 and execute authorization 54, to enable the designer to "check-out" a desired version of the integrated circuit design. A designer identified as external might be denied practically all tag accesses, to prevent the designer from ever having access to a "complete picture" of the integrated circuit. Limited access may allow the external designer to still work on an individual circuit module (if authorized by a respective authorization module file authorization 40), but never be able to extract the entire integrated circuit design via a tag 28. The limited access may provide an additional security feature to prevent confidential proprietary information being released to unauthorized users or external designers.

Figure 6:
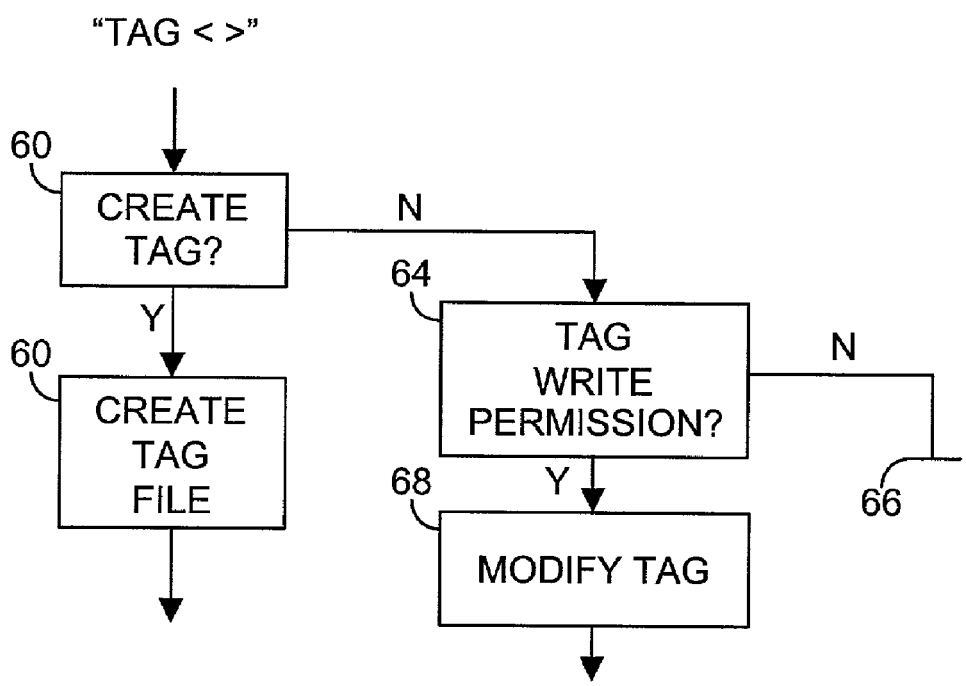
FIG. 6 is a flow diagram showing the creation and editing of a tag.

FIG. 6 illustrates processing steps which may be used for creating and editing a tag file 42. The process may, for example, be instigated by inputting a command "TAG < >" where "< >" represents the name of the tag 28.

The process firstly proceeds to step 60 at which it may be determined if the tag 28 may be created. If yes, the process generally proceeds to step 62 at which the tag file 42 representing the tag 28 may be created, and the respective tag authorizations 50 may be set up. The authorizations 50 may either be based on default information, or on externally prompted information, or on information accompanying the "TAG" command.

At step 60 it may be determined that the tag 28 already exists, so the process may proceed to step 64 at which it may be determined whether the current user has tag write permission, indicated by the tag write authorization 56 for that user stored in the tag file 42 for the tag 28. If not, then the user is generally denied permission to continue, and the process may halt at 66. If the user has tag write permission, then the process generally proceeds to step 68 at which the authorizations 52, 54 and 56 for the tag file 42 may be modified, and/or the list 44 of module file versions associated with the tag 28 may be modified.

Figure 7:
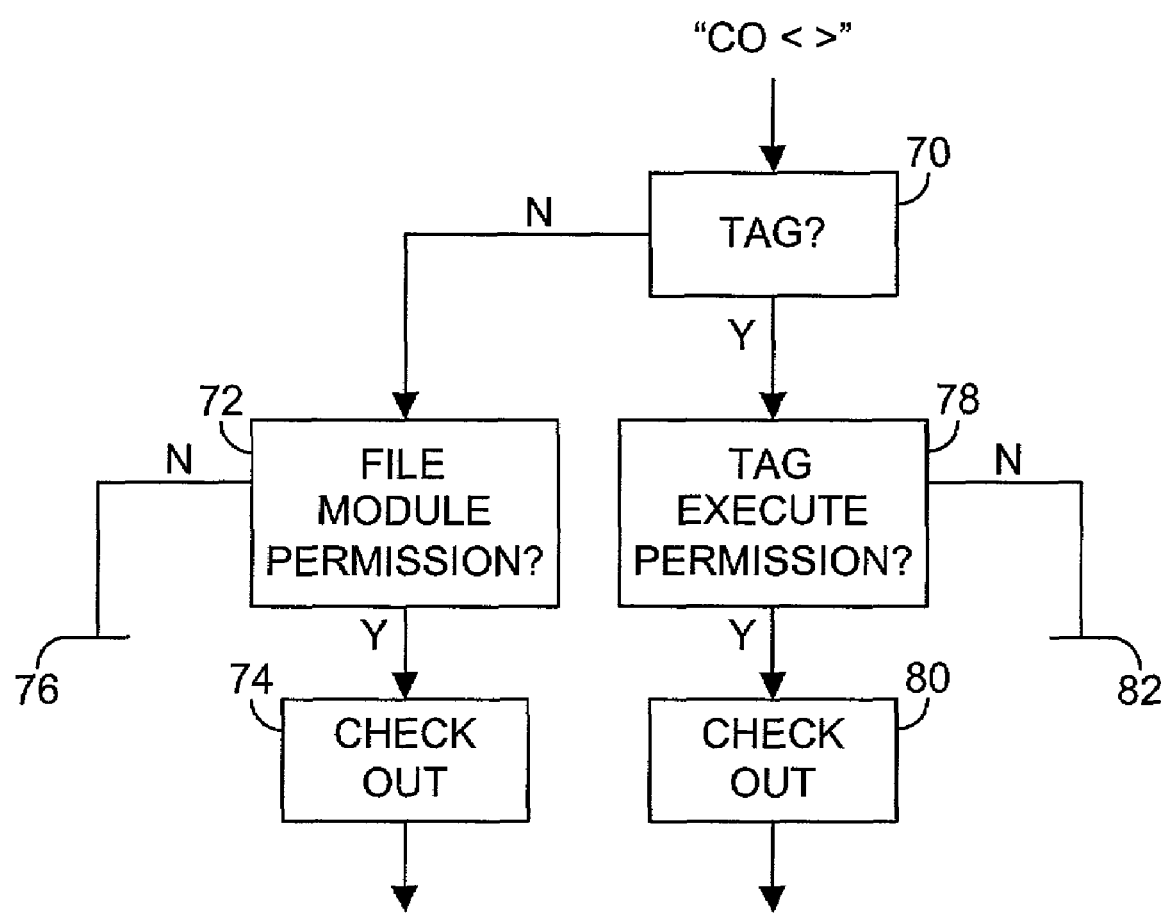
FIG. 7 is a flow diagram showing use of tag permissions for tag execution.

FIG. 7 illustrates processing steps which may be implemented by the check-out engine 15b for checking out a version of an integrated circuit design by a tag name. The check-out process may be instigated by the command "CO< >" where "< >" represents the name of the tag or individual module to be checked-out.

The process firstly proceeds to step 70 at which it may be determined whether or not the command is generally associated with a tag 28, or whether the user desires to check-out an individual module file 20-26. If an individual module file may be required, then the process may branch to step 72 at which it may be determined whether the user has permission (according to the authorizations 40 for the module file) to access the file. If yes, the process generally proceeds to check-out step 74. If no, then check-out access may be denied to the user, and the process may halt at 76.

At step 70 it may be determined that the command specifies a tag name, then the process generally proceeds to step 78 at which it may be determined whether the user has execute permission for that tag 28 (as defined by the execute authorization 54 for that user in the tag file 42 for the tag 28). If yes, the process may proceed to check-out step 80 for checking out all of the respective module file versions associated with the tag 28. If no, then check-out access may be denied to the user, and the process may halt at 82.

Although the above description has focused on the aspect of integrated circuit design (which remains a primary application of the invention in view of the increasing complexity of, and volume of design data for, integrated circuits), it will be appreciated that the principles of the invention could be applied to other design fields, for example, general circuit design and software design.

The function performed by the flow diagrams of FIGS. 6 and 7 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention this may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

It will be appreciated that the foregoing description is merely illustrative of a preferred form of the invention, and that many modifications and equivalents may be used within the scope of the invention. Accordingly, the appended claims are to be construed broadly to include all such modifications and equivalents.

The invention claimed is:

1. A method of controlling access to a database storing a design, comprising the steps of:
    (A) identifying a first version of said design by creating a first of a plurality of lists in a first identifier, each of said lists designating a respective subset of a plurality of module files that make up a respective version of said design;
    (B) allocating a plurality of first authorizations to said first identifier, each of said first authorizations comprising (a) a first permission granting one or more first users among a plurality of available users a first access to a respective first one of said module files in said database, wherein said first access includes (i) reading said respective first module file from said database, (ii) checking said respective first module file out of said database and (iii) writing said respective first module file into said database and (b) first information identifying one or more second users among said available users, wherein said first information is indicative of whether said second users have access to said first list;
    (C) controlling reading of said module files from said database in accordance with said first authorizations;
    (D) controlling modification of said module files in said database in accordance with said first authorizations;
    (E) creating evolved design data containing design differences between a previous version and a new version of said respective first module file;
    (F) adding said evolved design data to said respective first module file; and
    (G) reassembling said current version of said respective first module file by applying said evolved design data to said previous version of said respective first module file.

2. The method according to claim 1, wherein said design is of an integrated circuit.

3. The method according to claim 1, wherein each of said first authorizations further comprises second permission granting a group of third users among said available users said first access to said respective first one of said module files.

4. The method according to claim 1, further comprising the steps of:
    identifying a second version of said design by creating a second of said lists in a second identifier;
    allocating a plurality of second authorizations to said second identifier, each of said second authorizations comprising (a) a second permission granting one or more third users among said available users a second access to a respective second one of said module files in said database, wherein said second access includes (i) reading without removing said respective second module file from said database, (ii) removing said respective second module file from said database and (iii) writing said respective second module file into said database and (b) second information identifying one or more fourth users among said available users, wherein said second information is indicative of whether said fourth users have access to said second list; and controlling said second access to said second version of said design in accordance with said second authorizations.

5. The method according to claim 4, wherein said first authorizations are distinct from said second authorizations.

6. The method according to claim 1, wherein each of said first authorizations further comprises second information associated with a plurality of third users among said available users, said second information being indicative of whether said third users have permission to modify said first version of said design.

7. The method of claim 1, wherein each of a plurality of second files of said module files represents a respective version of a single portion of said design.

8. The method of claim 1, wherein said first information is further indicative of whether said second users have access to read said first list.

9. The method of claim 1, wherein each of said first authorizations further comprises second information associated with one or more third users among said available users, said second information being indicative of whether said third users have access to all of said first version of said design.

10. The method of claim 1, wherein said first information is further indicative of whether said second users have access to modify said first list.

11. The method of claim 1, wherein each of said first authorizations further comprises second information associated with one or more third users among said available users, said second information indicative of whether said third users have access to modify said first authorizations.

12. The method according to claim 1, wherein said first identifier and said first authorizations are stored as a file object in said database.

13. The method according to claim 1, wherein said first users comprise (i) a project design leader type of said available users and (ii) a circuit designer type of said available users.

14. A system for managing a design the system comprising:
a database disposed in a computer and configured for storing:
a plurality of module files representing plural versions of said design; and
a plurality of identifiers for identifying different versions of said design, each of said identifiers including (A) a plurality of lists, each of said lists designating a respective subset of said module files that make up a respective version of said design and (B) a plurality of authorizations, each of said authorizations comprising (a) permission for one or more first users among a plurality of available users to access a respective one of said module files in said database, wherein said access includes (i) reading said respective module file from said database, (ii) checking said respective module file out of said database and (iii) writing said respective module file into said database and (b) information identifying one or more second users among said available users, wherein said information is indicative of whether said second users having access to said lists;
a check-in engine disposed in said computer and configured to (i) control modification of said module files in said database based on said authorizations, (ii) create evolved design data containing design differences between a previous version and a new version of said respective module file and (iii) add said evolved design data to said respective module file; and
a check-out engine disposed in said computer and configured to (i) control reading of said module files from said database based on said authorizations and (ii) reassemble said current version of said respective module file by applying said evolved design data to said previous version of said respective module file.

15. The system according to claim 14, wherein said design is of an integrated circuit.

16. The system according to claim 14, wherein said information is further indicative of permission to only read said module files representing said design.

17. The system according to claim 14, wherein said information is further indicative of permission to modify said module files in said database.

18. A system for managing information representing a design, the system comprising:
a database disposed in a computer and configured for storing:
a plurality of module file objects (i) representing a plurality of electronic modules of said design and (ii) configured for storing plural versions of said electronic modules; and
a plurality of identifier file objects each (i) being associated with definable versions of said electronic modules to represent a definable version of said design and (ii) comprising (a) a plurality of lists, each of said lists designating a respective subset of said module file objects that make up a respective version of said design and (b) a plurality of authorizations, each of said authorizations comprising (1) permission for one or more first users among a plurality of available users to access said electronic module in said database in respect of said definable version of said design, wherein said access includes (i) reading said electronic modules from said database, (ii) checking said electronic modules out of said database and (iii) writing said electronic modules into said database and (2) information identifying one or more second users among said available users, wherein said information is indicative of whether said second users having access to said lists;
a check-in engine disposed in said computer and configured to (i) control modification of said electronic modules in said database in accordance with said authorizations, (ii) create evolved design data containing design differences between a plurality of previous versions and a plurality of new versions of said electronic modules and (iii) add said evolved design data to said module file objects; and
a check-out engine disposed in said computer and configured to (i) control reading of said electronic modules from said database in accordance with said authorizations and (ii) reassemble said current versions of said electronic modules by applying said evolved design data to said previous versions of said electronic modules.

19. The database system according to claim 18, wherein said design is of an integrated circuit.

20. A system comprising:
means for storing disposed in a computer and configured to identify a first version of a design comprising (i) a plurality of lists in an identifier and (ii) a plurality of module files that make up said design in a first of said lists
means for (a) indicating authorizing disposed in said computer and configured to (a) indicate a permission for one or more first users among a plurality of available users to access said module files in a database, wherein said access includes (i) reading said module files from said database, (ii) checking said module files out of said database and (iii) writing said module files into said database and (b) indicate information identifying one or more second users among said available users to access to said list, wherein said information is indicative of whether said second users have access to said lists;

means for checking-in disposed in said computer and configured to (i) control modification of said module files in said database in accordance with said permission, (ii) creating evolved design data containing design differences between previous versions and new versions of said module files and (iii) adding said evolved design data to said module files; and means for checking-out disposed in said computer and configured to (i) control reading of said module files from said database in accordance with said permission and (ii) reassemble said current versions of said module filed by applying said evolved design data to said previous versions of said module files.

21. The system according to claim 14, wherein
said check-out engine is further configured to assemble said previous version of said respective module file by applying previous evolved design data to a base version of said respective module file.

\* \* \* \* \*